T. F. LITTLEJOHN.
DENTAL IMPRESSION TRAY.
APPLICATION FILED JUNE 8, 1920.
1,351,108.
Patented Aug. 31, 1920.
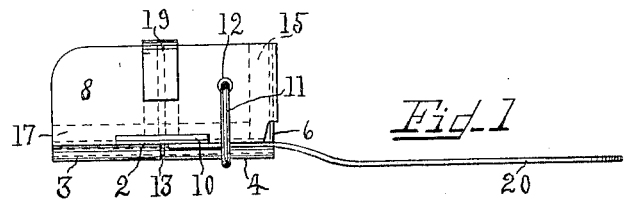
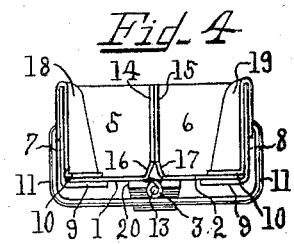
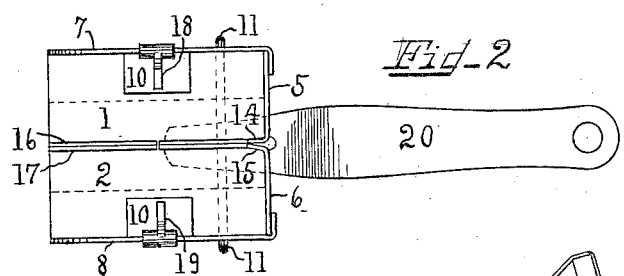
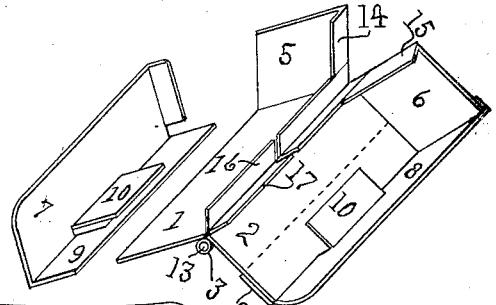
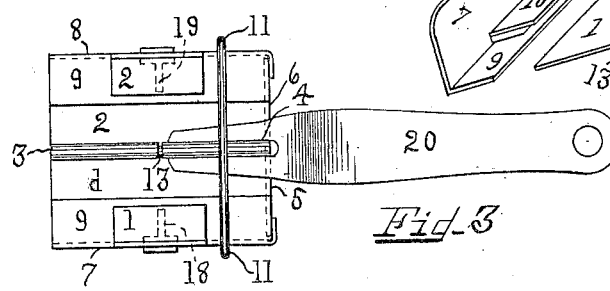
Inventor
Thomas F. Littlejohn.
F. P. Dederick.
Attorney

UNITED STATES PATENT OFFICE.

THOMAS F. LITTLEJOHN, OF PLANO, TEXAS.

DENTAL IMPRESSION-TRAY.

1,351,108.     Specification of Letters Patent.     Patented Aug. 31, 1920.

Application filed June 8, 1920. Serial No. 387,494.

*To all whom it may concern:*

Be it known that I, THOMAS F. LITTLEJOHN, a citizen of the United States, residing at Plano, in the county of Collin and State of Texas, have invented certain new and useful Improvements in Dental Impression-Trays, of which the following is a specification.

This invention relates to improvements in dental impression trays for the purpose of carrying a suitable impression material in which to make the impression, and is especially adaptable where only one, or a partial set of teeth are to be provided.

The primary object of my invention is to provide a separable dental impression tray of small size that may be readily and quickly assembled and especially adapted for use in making removable dental bridge work, it being particularly adapted to cases where an impression of but one tooth, or only partial impressions are to be taken.

In the drawing accompanying and forming a part of this specification,—all views being greatly enlarged, Figure 1 is a longitudinal side view of my improved dental impression tray assembled and ready for use; Fig. 2 is a top view of the same; Fig. 3 is a bottom view; Fig. 4 is an end view of Fig. 1; and Fig. 5 is a perspective view showing some of the parts separated.

Similar numerals of reference designate like parts throughout the different views of the drawing and in which, 1 and 2 indicate basal plates separably hinged longitudinally at 3 and 4 and provided with end portions 5 and 6 respectively. Side members 7 and 8 rightangularly flanged at 9 and provided with flanged portions 10 clasp the respective base plates, which support them in assembled position, and to thus retain them a clamp formed of spring wire is utilized comprising arms 11 with inwardly bent ends that are forced into slight recesses 12 in the sides, as clearly shown in Figs. 1 and 4. The hinged portion 3 is formed integrally with the basal plate 1 and carries a pintle 13 upon which the hinge portion 4, formed integrally with the plate 2 may freely turn, thus permitting the plates to swing into the position shown generally in Fig. 5, also rendering them separable. The end members 5 and 6 are flanged or ribbed on their inner edges as indicated by 14 and 15 and the base plates 1 and 2 have similar flanges 16 and 17, their object is to divide the impression and render the removal after the impression is obtained an easy matter.

The impression medium may in some cases be removed intact, but in most cases it must be broken, and the advantage of my device is that the breakage may be directed along fixed lines. Removably secured to the sides 7 and 8 are ribs 18 and 19. They embrace the side members as shown and are thus secured in the desired position. When so used they crease the impression material vertically upon both sides and by applying pressure to a thin metal strip inserted in the crease the impression may be readily transversely parted, which is of advantage when a small tooth is operated upon and the plaster impression material surrounding it is relatively greater. 20 represents a handle having a forked end that is forced above the curvature of the hinge 4 and adjacent the base plates 1 and 2 whereby it is secured and is readily removable.

The operation of my improved dental impression tray is substantially as follows; When an impression is to be made, the side members 7 and 8 are placed into position and the tray closed and secured with the clamp 11 and the handle 20 attached, when the parts are secured in adjusted positions. The impression material, which may consist of plaster-of-Paris, or any other suitable composition, is then placed in the tray as desired. Thereupon the tray is inserted into the mouth of the patient and time is given to form the impression and to permit the medium to harden, and when this has taken place the handle 20 and clamp 11 are removed when the tray is worked apart and removed from the mouth of the patient, whereupon the impression medium may be readily removed. The fractures therein occurring will usually take place along the lines defined by the crease forming ribs and will usually be clean and definite and therefore readily mended for the further operation of the dentist.

Modifications of the device herein shown and described may be made, and I do not therefore confine myself in the claims hereto appended to the specific construction illustrated, it being merely what appears to me at the present time as the preferred embodiment of the device.

Having thus described my invention what I esteem as new and desire to secure by Letters Patent, is—

1. A dental impression tray comprising plate and end members, the former separably hinged longitudinally, side inclosing members attachable thereto, flanges on said plate and end members, and a clamp adapted to maintain said plates and sides in closed relation.

2. A dental impression tray comprising longitudinally hinged plate members, end members formed integrally therewith, said plates and ends having inwardly projecting flanges relatively adjacent when the tray is in closed relation, and a clamp adapted to maintain said tray in said relation.

3. A dental impression tray comprising longitudinally hinged plate members, end members formed integrally therewith, said plates and ends having inwardly projecting flanges, side members attachable to the plates, a handle slidably attachable beneath said plates and a clamp adapted to maintain the plates and sides in closed relation.

In testimony whereof I affix my signature.

THOMAS F. LITTLEJOHN.